US010719747B2

(12) United States Patent
Stewart et al.

(10) Patent No.: US 10,719,747 B2
(45) Date of Patent: Jul. 21, 2020

(54) SYSTEMS, APPARATUS AND METHODS FOR LABELING, PACKAGING, AND TRACKING SURGICAL ARTICLES

(71) Applicants: Brian E. Stewart, Ladera Ranch, CA (US); William Stewart, San Clemente, CA (US); Jan Svoboda, Matthews, NC (US)

(72) Inventors: Brian E. Stewart, Ladera Ranch, CA (US); William Stewart, San Clemente, CA (US); Jan Svoboda, Matthews, NC (US)

(73) Assignee: Innovo Surgical, Inc., Ladera Ranch, CA (US)

( * ) Notice: Subject to any disclaimer, the term of this patent is extended or adjusted under 35 U.S.C. 154(b) by 0 days.

(21) Appl. No.: 15/944,645

(22) Filed: Apr. 3, 2018

(65) Prior Publication Data

US 2018/0285704 A1 Oct. 4, 2018

Related U.S. Application Data

(60) Provisional application No. 62/480,965, filed on Apr. 3, 2017.

(51) Int. Cl.
*G08B 1/08* (2006.01)
*G06K 17/00* (2006.01)
(Continued)

(52) U.S. Cl.
CPC ......... *G06K 17/00* (2013.01); *G06K 7/10366* (2013.01); *G06Q 10/00* (2013.01);
(Continued)

(58) Field of Classification Search
CPC ............... G06K 17/00; G06K 7/10366; G06K 2007/10504; G06K 2007/10524;
(Continued)

(56) References Cited

U.S. PATENT DOCUMENTS 3,941,132 A 3/1976 Lenaghan
3,965,907 A 6/1976 Hardy et al.
(Continued)

FOREIGN PATENT DOCUMENTS

EP 0948940 A1 10/1999
WO WO-9422580 A1 10/1994
(Continued)

OTHER PUBLICATIONS

PCT/US2018/025946 International Search Report dated Jul. 26, 2018.

*Primary Examiner* — Anh V La
(74) *Attorney, Agent, or Firm* — Wilson Sonsini Goodrich & Rosati

(57) ABSTRACT

Surgical articles, such as sponges, are provided in a pack which contains individual surgical articles having UHF RFID or other electronic labels which provide both (a) unique identification information for each article as well as (b) unique identification information for all articles in the pack. Prior to the surgical procedure, the labels are scanned and the identification information for all articles in the pack uploaded to a processor to create a list of available individual surgical articles. At the end of the surgical procedure, the surgical articles are collected and the electronic labels read and compared to the initial list to determine if there are any unaccounted individual surgical articles. The UHF RFID tag may then be used to determine a location of the unaccounted article outside the patient's body.

19 Claims, 9 Drawing Sheets

(51) Int. Cl.
*G06K 7/10* (2006.01)
*G06Q 10/00* (2012.01)

(52) U.S. Cl.
CPC .............. G06K 2007/10504 (2013.01); G06K 2007/10524 (2013.01)

(58) Field of Classification Search
CPC .......... G06K 17/0022; G06K 7/10396; G06K 7/10415; G06Q 10/00; A61B 90/98; A61B 2090/0805; G16H 40/20
USPC ... 340/539.21, 539.32, 539.1, 572.1, 286.07, 340/568.1; 600/300
See application file for complete search history.

(56) References Cited

U.S. PATENT DOCUMENTS

| | | |
|---|---|---|
| 4,098,728 A | 7/1978 | Rosenblatt |
| 4,114,601 A | 9/1978 | Abels |
| 4,244,369 A | 1/1981 | McAvinn et al. |
| 4,264,575 A | 4/1981 | Zimmerman et al. |
| 4,477,256 A | 10/1984 | Hirsch |
| 4,626,251 A | 12/1986 | Shen |
| 4,639,253 A | 1/1987 | Dyer et al. |
| 4,645,499 A | 2/1987 | Rupinskas |
| 4,658,818 A | 4/1987 | Miller, Jr. et al. |
| 4,711,996 A | 12/1987 | Drexler |
| 4,718,897 A | 1/1988 | Elves |
| 4,832,198 A | 5/1989 | Alikhan |
| 4,917,694 A | 4/1990 | Jessup |
| 5,031,642 A | 7/1991 | Nosek |
| 5,041,103 A | 8/1991 | Rupinskas |
| 5,045,080 A | 9/1991 | Dyer et al. |
| 5,049,219 A | 9/1991 | Johns et al. |
| 5,057,095 A | 10/1991 | Fabian |
| 5,074,840 A | 12/1991 | Yoon |
| 5,112,325 A | 5/1992 | Zachry |
| 5,231,273 A | 7/1993 | Caswell et al. |
| 5,374,813 A | 12/1994 | Shipp |
| 5,443,082 A | 8/1995 | Mewburn |
| 5,456,718 A | 10/1995 | Szymaitis |
| 5,610,811 A | 3/1997 | Honda |
| 5,629,498 A | 5/1997 | Pollock et al. |
| 5,637,850 A | 6/1997 | Honda |
| 5,650,596 A | 7/1997 | Morris et al. |
| 5,678,569 A | 10/1997 | Chew et al. |
| 5,805,451 A | 9/1998 | Speas et al. |
| 5,923,001 A | 7/1999 | Morris et al. |
| 5,931,824 A | 8/1999 | Stewart et al. |
| 5,991,728 A | 11/1999 | Debusk et al. |
| 6,998,541 B2 | 2/2006 | Morris et al. |
| 7,158,030 B2 | 1/2007 | Kwong-Tai Chung et al. |
| 7,703,674 B2 | 4/2010 | Stewart et al. |
| 7,795,491 B2 | 9/2010 | Stewart et al. |
| 8,105,296 B2 | 1/2012 | Morris et al. |
| 8,181,860 B2 | 5/2012 | Fleck et al. |
| 8,193,938 B2 | 6/2012 | Halberthal et al. |
| 8,256,674 B2 | 9/2012 | Fleck et al. |
| 8,428,517 B2 | 4/2013 | Ting et al. |
| 8,446,254 B2* | 5/2013 | Carrick .................... G01S 5/14 340/10.1 |
| 8,479,989 B2 | 7/2013 | Fleck et al. |
| 8,872,662 B2 | 10/2014 | Halberthal et al. |
| 8,985,446 B2 | 3/2015 | Fleck et al. |
| 9,289,943 B2 | 3/2016 | Halberthal et al. |
| 9,414,973 B2 | 8/2016 | Fleck et al. |
| 9,471,820 B2 | 10/2016 | Arthaber et al. |
| 9,530,036 B2 | 12/2016 | Fleck et al. |
| 9,672,397 B2 | 6/2017 | Fleck et al. |
| 9,974,625 B2 | 5/2018 | Fleck et al. |
| 2002/0049650 A1 | 4/2002 | Reff |
| 2007/0125392 A1 | 6/2007 | Olson et al. |
| 2008/0237431 A1 | 10/2008 | Tarr |
| 2009/0317002 A1* | 12/2009 | Dein .................... A61B 50/362 382/224 |
| 2010/0134287 A1 | 6/2010 | Lettieri |
| 2010/0179822 A1* | 7/2010 | Reppas ................. G06Q 10/08 705/2 |
| 2011/0174877 A1 | 7/2011 | Fleck et al. |
| 2012/0095422 A1 | 4/2012 | Morris et al. |
| 2013/0327826 A1 | 12/2013 | Fleck et al. |
| 2014/0125482 A1 | 5/2014 | Rigsby et al. |
| 2015/0216610 A1 | 8/2015 | Augustine |
| 2016/0070942 A1 | 3/2016 | Dor et al. |

FOREIGN PATENT DOCUMENTS

| | | |
|---|---|---|
| WO | WO-9830166 A1 | 7/1998 |
| WO | WO-2018187368 A1 | 10/2018 |

* cited by examiner

| 4 | 4 | 0 | 0 | 1 | 0 | 3 | 0 | 5 | 0 | 0 | 1 |
|---|---|---|---|---|---|---|---|---|---|---|---|
| TYPE | | PACK IDENTIFICATION NO. | | | | | | | | SERIAL NO. | |
| | | SPONGE IDENTIFICATION NO. | | | | | | | | | |

FIG. 7A

| 4 | 4 | 0 | 0 | 1 | 0 | 3 | 0 | 5 | 0 | 0 | 5 |
|---|---|---|---|---|---|---|---|---|---|---|---|
| TYPE | | PACK IDENTIFICATION NO. | | | | | | | | SERIAL NO. | |
| | | SPONGE IDENTIFICATION NO. | | | | | | | | | |

FIG. 7B

| 1 | 0 | L | T | B | B | 6 | 9 | 7 | 5 | 0 | 3 |
|---|---|---|---|---|---|---|---|---|---|---|---|
| TOTAL NO. | | TYPE | | PACK IDENTIFICATION NO. | | | | | | SERIAL NO. | |
| | | | | SPONGE IDENTIFICATION NO. | | | | | | | |

FIG. 7C

| TID FIELD | | EPC FIELD | | | | | | | |
|---|---|---|---|---|---|---|---|---|---|
| 4 | 4 | 6-8 BYTES | 3 | 7 | 2 | 0 | 5 | 2 | 1 | 8 | 0 | 7 |
| TYPE | | SECURITY CODE | PACK IDENTIFICATION NO. | | | | | | SERIAL NO. |
| | | | SECURE SPONGE IDENTIFICATION NO. | | | | | | |
| | | | | SPONGE IDENTIFICATION NO. | | | | | |

FIG. 7D

SYSTEMS, APPARATUS AND METHODS FOR LABELING, PACKAGING, AND TRACKING SURGICAL ARTICLES

CROSS-REFERENCE TO RELATED APPLICATIONS

This application claims the benefit of provisional application 62/480,965, filed on Apr. 3, 2017, the full disclosure of which is incorporated by reference.

BACKGROUND OF THE INVENTION

1. Field of the Invention

The present invention relates generally to surgical articles used during surgery. More particularly, the present invention relates to systems, methods, and methods for labelling, packaging, and tracking sponges and other articles used in surgical procedures.

During a surgical procedure it is generally necessary for surgical articles to be placed into or around the patient's surgical incision site. Such articles may include surgical instruments, towels, sponges and the like. Before, during and after surgical procedures surgical teams go to great efforts to account for all the surgical articles using during that surgery in an attempt to avoid one or more of those items being inadvertently left inside a patient. Patient morbidity associated with unintentionally retained surgical articles can range from infection to mortality and the financial implications can be substantial.

Due to a number of factors surgical articles made of fabric or fabric like materials, such as surgical sponges and towels, prove particularly difficult to account for during and after surgery. Accordingly, these types of surgical articles account for the majority of items inadvertently left inside patients. Surgical sponges and towels are commonly used during surgical procedures to absorb body fluids, mostly blood, of the patient both inside the incision and around the surgical site. These surgical items are usually made of flexible, absorbent fabric or fabric like material such as cotton and are often intentionally or unintentionally folded one or more times during use. Additionally, when saturated with blood these items alter in size and shape and therefore become hard to distinguish from body tissue and each other.

In an effort to avoid unintentionally leaving surgical articles inside patients after surgery, surgical teams routinely count all the individual items before and after each surgery. If the count of these items taken after a surgical procedure does not match the count prior to that procedure, efforts are made to find the missing item or items until the counts match. Such manual counts are labor intensive and time consuming. Moreover, even the best manual counting efforts can fail and surgical sponges and other articles are sometimes left in the patient, causing the problems noted above.

In an effort to reduce workload and expense, and most importantly decrease life-threatening errors, barcoding, radio frequency tagging, and other identification and tracking systems are now being utilized by surgical teams to assist them in counting and accounting for surgical articles. While a vast improvement over manual counting alone, many of the presently available systems are still costly and can still be time consuming. In particular, while these labelling/tagging systems are very good at determining when a sponge or other article is missing, they often provide little assistance in locating the missing article.

For these reasons it would be desirable to provide alternative and improved systems, methods and apparatus for the tracking of surgical articles used during surgery. In particular, it would be desirable to provide alternative systems, methods and apparatus which simplify and reduce the cost of labelling surgical articles to allow subsequent tracking. It would further be desirable to provide labels, labelled packages, and systems which facilitate initially identifying the articles used in a procedure and performing integrity checks on packages of articles before they are opened for use. Additionally, it would be useful to provide labels and labelled articles which are easier to locate at the end of a procedure when those articles have not been accounted for after use. At least some of these objectives will be met by the inventions described herein.

2. Background of the Prior Art

U.S. Pat. No. 5,931,824, having common inventorship with the present application, describes a system for tracking sponges having labels with machine-readable information, typically in the form of a bar code, which is unique as to all labelled articles used in a particular surgery. The surgical articles may be scanned in and counted in an automated format at the beginning of a surgery. Used articles are scanned as they are removed from the patient, and the identification information of all sponges initially scanned in can be compared with the scanned information for all sponges removed. While very effective, the need to individually scan individual articles with a direct line of site technology like a barcode reader is time-consuming and can introduce error, and the identification information provides no help in locating the missing sponges.

U.S. Pat. Nos. 7,703,674 and 7,795,491, also having common inventorship with the present application, describe an improvement over the '824 patent where a package of sponges or other articles includes an additional label having machine-readable information which includes most or all of the information from each and every label on the sponge or other article. The package label can be scanned once in order to upload the identification, type, and other information from the individual sponges or other articles to the computer or other operating system. The individual article labels can then be scanned as they are removed from the patient. The creation of an additional label having machine-readable information which includes most or all of the information from each and every label on the sponge or other article can add considerable cost to the packaging of sponges or other articles. The '674 and '491 patents also describe the use of a "visual motifs," such as color or shape, etc. which can be associated with individual articles and included in the article label information so that the system can alert the users to a visual cue of the missing article. Such visual aids have not provided a complete solution to locating missing articles, particularly missing sponges that can be covered with blood and lost in a pile of sponges that masks any visual cue.

The use of RFID tags for determining the distance to an article is described in U.S. Pat. No. 9,471,820. The use of RFID tags for medication tracking is described in U.S. Pat. No. 7,158,030. U.S. Pat. Publ. No. describes the use of high and ultra-high frequency RFID tags on a surgical sponge together with and a separate electronic surveillance indicator (EAS) identifier for tracking said sponges.

Other pertinent patents and published applications include U.S. Pat. Nos. 3,941,132; 3,965,907; 4,098,728; 4,114,601; 4,244,369; 4,264,575; 4,477,256; 4,626,251; 4,639,253; 4,645,499; 4,658,818; 4,711,996; 4,718,897; 4,832,198; 4,917,694; 5,031,642; 5,041,103; 5,045,080; 5,049,219; 5,057,095; 5,074,840; 5,112,325; 5,231,273; 5,374,813; 5,443,082; 5,456,718; 5,610,811; 5,629,498; 5,650,596; 5,637,850; 5,678,569; 5,805,451; 5,923,001; 5,991,728;

6,998,541; 8,105,296; and 8,428,517; U.S. Publs. 2002/0049650; 2008/237431; 2011/174877; 2012/095,422; WO 94/22580; WO 98/30166; and EP 0948940.

SUMMARY OF THE INVENTION

In the first aspect, the present invention provides a method of accounting for surgical articles used in a surgical procedure, such as surgical sponges, towels, and the like, used in open surgeries. The surgical sponges or other articles are usually provided in a package, such as a 5-pack or 10-pack of surgical sponges bound by a paper band or other tie, where each surgical article has an electronic label and each electronic label provides data which includes (a) unique identification information for that article and (b) unique identification information for all other articles in that same pack or package.

Prior to performance of the surgical procedure, the electronic label of at least one surgical article in the pack or other package is scanned to read and obtain the unique identification information for that article as well as the unique identification information for each other individual article in the pack or package. As described in more detail below, the identification information carried by any one of the electronic labels will include not only the unique identification information for that individual article, but also identification information that is unique to each of the other individual articles in the same pack or package. The identification information for all of the articles is then uploaded as an initial list of articles to a processor.

The identification information is also uploaded from each of the individual surgical articles to the processor to create a list of available individual surgical articles. At least some of the individual surgical articles from the package are used in the surgical procedure while others of the individual articles may not be used. During and after the surgical procedure, as used surgical sponges and other articles are removed and collected, the electronic labels on each removed individual surgical article is read and uploaded to the processor. The labels from the surgical articles that were not used in the procedure are also read, and the identification information from both the used and unused articles is uploaded to the processor to create a list of recovered or accounted individual surgical articles. By comparing the list of available surgical articles with the list of recovered surgical articles, any individual surgical articles missing, unaccounted articles can be identified.

Optionally, as described in more detail below, the initial list of articles compiled by scanning a single electronic label may be compared with the list of available individual surgical articles compiled by scanning each article present in the pack that has been delivered to the operating room (OR). These lists should be the same, but if they differ, the pack can be considered defective. The defect may be a sponge that has been lost, or may be an additional sponge that was not intended to be in the pack. In either case, the defective pack will usually be discarded.

In specific embodiments of this method, the electronic labels on each individual surgical article may comprise a radio frequency identification (RFID) tag affixed to each surgical article, typically being an ultra-high frequency (UHF) RFID tag. The data encoded on each UHF or other RFID tag typically comprises at least an article type code, a pack identification code unique to that pack or package, an article count code representing the total number of articles in the pack or package, and an article code which distinguishes that article from all other articles in that particular pack or package.

In a second aspect, the present invention provides an electronic label for surgical articles assembled in a pack for use in a surgical procedure. The label is typically configured to be attached to a backing which is suitable for attachment to the surgical article, e.g., by heat pressing, stitching, placement in a pouch, or the like. The label further comprises an electronic tag affixed to the backing, where the electronic tag is programmable with data which includes (a) unique identification information for each individual surgical article and (b) identification information unique for that pack of articles, i.e. information that identifies all other articles expected to be in that particular pack.

In specific embodiments of the electronic label, the data may comprise an article type code, a pack identification code unique to the pack, an article count code representing the total number of articles in the pack, and a unique article code distinguishing that article from all other articles in the pack. In some embodiments the unique article code may be a sequence number based on the total number of articles in the pack, such as 1/10, 2/10, 3/10 and the like. The electronic tag may also include information which provides the total number of articles in the pack. In some cases that will be provided by an actual number. In other cases, the total number of articles can be inferred from the article identification information or the unique identification information otherwise included on the label.

In other specific aspects, the data comprise an article type code, a pack identification code unique to all the articles in the pack, an article count code representing the total number of articles in the pack, and an article code distinguishing that article from all other articles in the pack. Typically, the data are programmable in at least three data fields on the tag, including an article type field, a pack identification field, and an article code field. In other specific instances, the data comprising the unique identification information for an individual surgical article may be a combination of information from the pack identification field and the article code field.

Most commonly, the electronic tag comprises an RFID tag affixed to a backing material, for example in the form of a commercially available UHF RFID tag. Even more commonly, the electronic tag consists of a single UHF RFID tag.

In a third aspect, the present invention provides a pack of surgical articles, typically surgical sponges, or other gauze articles, to be used in a surgical procedure. When the pack comprises a plurality of surgical articles, each article having an electronic label as the type described previously, the labels will have been programmed with both (a) the unique identification information for each individual article and (b) the unique identification information for others of the plurality of individual surgical articles in the pack. The pack will further include an enclosure or packaging band for holding the plurality of individual surgical articles together as a pack. The enclosure will usually comprise a band, particularly when the surgical articles are sponges, towels, or the like, but in other instances the pack may comprise a wrapping, a box, a tray, a bag, or the like.

In a fourth aspect of the present invention, a method for packing and labeling surgical articles comprises providing a plurality of surgical articles, such as surgical sponges, towels, or other gauze articles, where each article has an electronic label. The labels on each article are programmed with data which includes (a) unique identification information for each individual surgical article and (b) identification information unique for that pack of articles, i.e. information that identifies all other articles expected to be in that particular pack.

In specific embodiments of the method for packing and labelling surgical articles, the plurality of surgical articles will be programmed after having been assembled into the pack. In other embodiments, the individual surgical articles may not have been fully assembled, but will typically be at least present at a common location (e.g. all articles collected on a tray, bag, or other carrier and moved away from other articles) remote from other surgical articles to avoid unintended programming and confusion during assembly.

In still others specific embodiments of the methods for packing and labelling, the data comprises an article type code, a pack identification code unique to the pack, an article count code representing the total number of articles in the pack, and a unique article code distinguishing that article from all other articles in the pack. These data are typically programmable in at least three fields on the tag or label, including an article type field, a pack identification field, and a unique article code field. The unique identification information for an individual surgical article will often be a combination of information from the pack identification and the unique article code field. As with previous embodiments of the present invention, the electronic labels typically comprise an RFID tag affixed to a backing, usually a UHF RFID tag. More usually, in a single UHF RFID tag will be affixed to the backing. In other specific embodiments, assembling may comprise banding, wrapping, boxing, or bagging, or placing articles on a tray.

In a fifth aspect, the present invention provides a method for locating missing or unaccounted surgical articles at the end of a surgical procedure. In such surgical procedures, a plurality of surgical articles have been provided for use in the surgical procedure at the outset, and each of the plurality of articles is affixed with a UHF RFID tag (the tag is affixed to an exterior or otherwise incorporated into the sponge) programmed with identification data unique to that particular surgical article. During and/or at the end of the surgical procedure, the surgical articles are counted out and the UHF RFID identification information from each article which has been counted out is read and uploaded to the processor. The count out may be a combination of manual counting and the scanning of the RFID labels to perform an electronic count, or in some cases the sponges or other article may be removed from the patient and scanned to perform an electronic count without manual counting. The UHF RFID identification information for any surgical articles which were initially read in but were not used is also read and uploaded to the processor. The identification information from both the collected and used articles represents an list of articles which have been accounted for at the end of the surgical procedure.

By comparing the list of articles which have been accounted for at the end of the surgical procedure with the list of articles available for use at the beginning of the procedure, a list of missing or unaccounted articles can be made by the processor. In particular, the identification information for missing or unaccounted surgical articles is collected, presented to the user, and will be available for a subsequent search protocol. If there are missing articles, they may be located by emitting a UHF RFID query or interrogation signal from an RFID reading device which causes the UHF RFID tags on all surgical articles in range to reflect their unique identification data. By uploading the reflected identification data from the RFID reading device to the processor, the reflected identification data from the RFID label of any one missing surgical article can be detected from among the identification of all scanned labels based on the unique identification code of the missing surgical article (so long as it is within the scanning range of the UHF RFID reader). Once the unique identification code of the missing or unaccounted surgical article is detected, the article has been "electronically' located, an indication or representation of distance between the missing surgical article and the RFID reading device may be calculated or otherwise determined and provided to a user to aid the user in "physically" locating the missing surgical article. The distance is usually calculated or estimated based on the measured or perceived power level of the reflected signal from the UHF RFID tag at the RFID reader, and a numeric or visual indication of the estimated distance can be visually displayed on the interface and/or aurally presented to the user.

Additionally, once it is determined that the unique identification code of the unaccounted surgical article is reflected back to the RFID reader, the reader, processor or other component of the system can emit a visual and/or aural signal alerting the user that the sponge or other surgical article has been identified. A subsequent query can then be sent by the RFID reader, a reflected signal from the unaccounted for surgical article received and a subsequent visual and/or aural signal alerting the user that the surgical article has been identified a subsequent time and further the subsequent visual and/or aural signal can be of a nature that alerts the user to the relative signal strength of the subsequent query, allowing the user to determine if the RFID is reader is closer to or farther away from the unaccounted for surgical article at the time of the subsequent query. This process can be repeated multiple times to aid the user in finding the unaccounted for surgical article.

In a specific aspect, the UHF RFID query signal can be of a type and a power level that will not penetrate tissue. Thus, the method for locating will be effective only with articles that have been removed from the patient but not yet counted out. If all removed articles and the area surrounding the patient are fully scanned and the missing article is not identified, it can be assumed to still be within the patient's body, and the patient can be sent to fluoroscopy or other steps can be taken to locate the missing article within the patient. While the present application might also use UHF RFID query signals of a type and a power level that can at least partially penetrate tissue, scanning a patient internally will generally be useful only after all external sponges have been accounted for and a user is searching for sponges missing from the count.

In a sixth aspect of the present invention, a method of authenticating surgical articles used in a surgical procedure comprises providing a pack which contains a plurality of individual surgical articles, wherein each individual surgical article has an electronic label and wherein each label provides data which includes (a) unique identification information for that article (usually including or consisting of both pack identification information and article identification information as described elsewhere herein) and (b) a security code generated based on other data present on the label using a key algorithm. Prior to the surgical procedure, the electronic label of at least one surgical article in the pack is scanned to obtain data including both the unique identification information and a security code for at least one individual surgical article. A security code is then generated from the scanned data using the same key algorithm, and the security code so generated is then compared with the original security code (which was scanned at the same time as the information data) to confirm that the surgical article was produced by a producer having the same key algorithm.

In specific instances, the other data present on the electronic label includes information in the label manufacture's identification field. In other instances, each electronic label further comprises an article type code, a pack identification code unique to that pack, an article count code representing the total number of articles in the pack, and an article code distinguishing that article from all other articles in the pack. In still other specific instances, scanning comprises scanning the electronic labels of all surgical articles in the pack, determining the unique identification information for each article expected to be in the pack, and comparing the unique identification information for each article expected to be in the pack with the unique identification information for each article actually scanned to determine if any surgical articles are missing or in any additional surgical articles are present.

In a seventh aspect, the present invention provides a method for encoding a security code onto an electronic label of the type which includes at least a pre-loaded and locked label or "manufacturer's" identification field and a programmable identification field that can be loaded and locked by the user, i.e. the maker of the surgical or other article to be labeled. The method comprises providing (1) an electronic label loaded with manufacturer identification information in a locked memory and (2) data representing user identification information for an article intended to be loaded onto the electronic label. While the method is specifically described for producing such labels for surgical sponges and other medical articles, the method will suitable for use with any type of article where secure labeling and identification is desired. The locked manufacturer identification information is read from the electronic label using conventional scanning techniques, and a key algorithm is used to combine the manufacturer identification information and the user identification information into an electronic signature. The electronic signature is loaded into the lockable user identification field on the electronic label, and the lockable user identification field on the electronic label is locked after the electronic signature has been loaded. The user identification information is also loaded onto the user identification field, either before or after the electronic signature is loaded, and the user identification field will typically be locked only once after both the user identification information and the electronic signature have been loaded. In other instances, however, the user identification information and the electronic signature can be loaded at different times and/or at different locations and the particular information locked onto the label at different times. These methods are particularly intended for use with UHF RFID tags.

In other embodiments and aspects, all information on the label can be scrambled or encrypted, including the article identification information and the security code. Decryption software would be provided to decrypt all the tag information, including the user information (package and article identification) and the tag manufacture's information. After that first level of decryption, the security code and product information can be determined as described elsewhere herein.

BRIEF DESCRIPTION OF THE DRAWINGS

FIGS. 7A-7D show exemplary identification code sequences which can be encoded on the RFID labels of the present invention.

DETAILED DESCRIPTION OF THE INVENTION

I. RFID Tagging Technology

Figure 1:
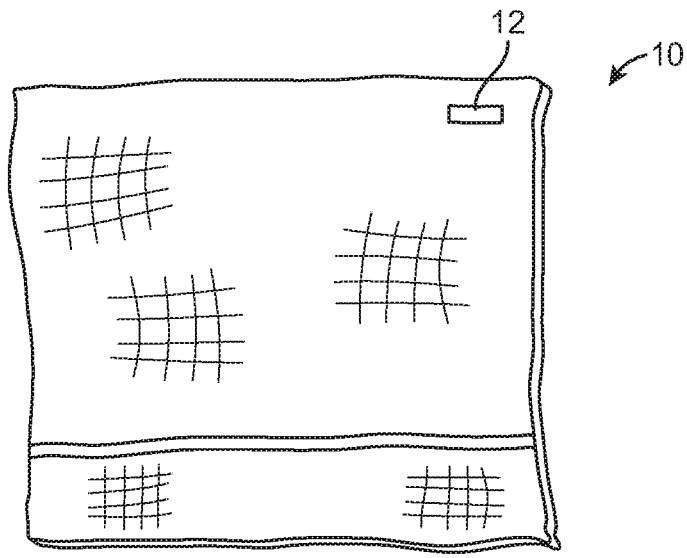
FIG. 1 illustrates a surgical sponge having a label including an RFID tag in accordance with the principles of the present invention.

Radio frequency identification (RFID) uses electromagnetic fields to identify and track RFID tags affixed to objects. RFID tags contain information stored electronically on a microchip and can either be battery powered (active) or utilize the radio energy transmitted by an RFID reader to reflectively transmit a signal. An RFID reader transmits an encoded radio signal to interrogate an RFID tag, then the RFID tag sends a response with the information it has been programmed to send. Unlike barcode technology, RFID technology does not require a direct line of site with the reader. The present invention will most commonly use reflective RFID technology which does not require a battery on the tag.

There are multiple frequency ranges utilized with RFID including Low Frequency RFID (120-150 kHz), High Frequency RFID (13.56 MHz), Ultra High Frequency RFID (865-868 MHz in Europe, 902-928 MHz in North America) and Microwave (2.45 GHz and 5.8 GHz). Generally these frequencies bands do not require a license if the transmitted power is limited. Some frequencies are used globally (High Frequency RFID) while others are specific to specific geographic regions (Ultra High Frequency). There are numerous considerations in selecting a frequency of RFID to utilize for a given RFID application including desired read range, medium through which reading will take place, amount of memory required, hardware requirements/limitations, cost and size constraints.

Heretofore, High Frequency RFID (HF RFID) has been most commonly used as part of systems for tracking surgical sponges. The data transmitted with HF RFID (typically 13.56 MHz) can be used to count surgical sponges and the frequency can in some instances penetrate human tissue allowing an HF RFID system to detect or find a sponge with an HF RFID tag attached even when in a patient's body in some circumstances.

High Frequency RFID systems, however, suffer from limitations. They are expensive, require large and relatively expensive readers, and in some circumstances, it may be not possible to successfully read a High Frequency RFID tag through human tissue. Additionally, because HF RFID tags may be read through human tissue an individual article may be mistakenly thought to be accounted for outside the patient's body when in fact it is still inside.

The RFID labels of the present invention will preferably employ UHF RFID which has been found to have a number of advantages for use in the present invention. UHF RFID tags are relatively low cost and have a greater degree of flexibility that HF RFID tags. The UHF RFID tags are usually also incapable of being read and detected when in or behind tissue. Thus, use of the UHF RFID detection technology allows a user to conclude that an UHF RFID tag on an unaccounted article which is detected is most likely outside the body and can be located using, for example, the article location protocols described below.

Integrated circuits for currently available UHF RFID inlays are typically manufactured under ISO18000-6C (also referred to as EPC Gen2) standards and have from 96 to 128 or more bits of user lockable memory for storage of user identification information, referred to as EPC or user lockable memory. Such EPC or user lockable memory allows a user to encode the UHF RFID tag with article identification and/or other information which can then be locked by the user to prevent subsequent tampering. Such UHF RFID circuits will also have 96, 128 or more bits of TID or other manufacturer locked memory for storage of unique manufacturer identification information, including article number, circuit model, and manufacturer. The manufacturer locked memory will have been locked by the manufacturer after the manufacturer identification information had been loaded to prevent tampering but remains readable for tracking and for the purposes of the present invention described hereinafter. The specific arrangement of the TID field will vary among manufactures. Other UHF RFID memory fields include User Memory, Reserved Memory (including circuit configuration, kill password, and access password), and optionally extended features and capabilities memory. While the data encoding protocols of the present invention described below typically only use the EPC and TID memory fields, use of the User Memory field could be employed additionally and/or in place of at least some of the information encoded in the EPC field. It is also expected that the principles of the present invention could be applied under appropriate circumstances to the password memory field, or any other memory features and capabilities found on current or future UHF RFID circuits. As the UHF RFIDS typically have less memory than HF RFIDS, efficient data storage on the UHF RFIDS is a necessity.

II. Preparation of RFID Labels

The sponges 10 (FIGS. 1 and 2) and other surgical articles of the present invention will have attached RFID labels 12 which comprise an RFID tag or inlay 16, typically a UHF RFID tag, affixed to a backing layer 18 (FIGS. 3-6). The UHF or other RFID tags or inlays 16 are programmable and formed as integrated circuit (IC) 20 which includes the RFID circuitry and a dipole, slot or other antenna 22. Antennae are available in a variety of designs depending on the likely conditions of use. The antenna is typically constructed of aluminum (or in some cases copper or silver and occasionally graphene or other thin film or material coated conductive material), and the backing layer may be a polyethylene terephthalate (PET) film or a similar material. Often, an RFID label 12' may be formed with a top layer 18' laminated or otherwise applied over the RFID tag or inlay 16 and underlying backing layer 18, and in some cases the inlay itself may form the finished label depending on the antenna technology and the manufacturing process.

Antennae used in the RFID tags of the present invention will usually be selected to have certain characteristics. For example, the antennae of the inlay will usually be selected to be compatible with the preferred UHF RFID's used in the present invention. The antennae will usually further be selected to function efficiently when the RFID tag is in proximity to fluids (e.g. blood and other body fluids), and further when twisted and/or contorted together with a sponge during use.

The IC stores information that is "written" or programmed into its memory. This memory is typically broken down into different types, some of which is fixed by the inlay manufacturer. The fixed memory may include protocols that allow the inlay to communicate with an RFID reader, information as to the manufacturer of the inlay, and the like. The programmable or "writable" memory (the portion of the memory allocated for the particular use of the inlay) is accessible by a programmer via an RFID reader/writer, allowing the user to enter information in the inlay which can then be retrieved by users with an RFID reader. Some memory can be "locked" once programmed. The IC will usually be "tuned" to be more easily scanned by a UHF RFID in a particular use case. The inlay used by the systems of the present invention will usually include an antenna specifically designed for the use in the sponge accounting systems herein and may include an IC that is tuned to be read in these same conditions.

In summary, RFID inlays used in the present invention are preferably designed and or/selected to meet certain requirements of the present invention including being easily scanned when in close proximity to multiple other inlays, e.g. when 5 or 10 sponges are stacked on top of each other. The RFID inlays should further be of a type that are easily scanned when sponges are being counted OUT or being located when lost (FOUND) e.g. when they are twisted, bent, contorted, folded and/or covered with blood and/or other body fluids as are sponges are after being removed from patient. The inlays must be sized to be affixed to a surgical sponge and should further be able to withstand the affixation process, e.g. attachment to a fabric material typically through a heat press or sewing process.

III. Fabricaton of Surgical Sponges with RFID Labels

The selected or custom-designed RFID inlays are converted into RFID labels, typically UHF RFID labels, for use with surgical sponges by adding material to give the label various desired characteristics. The inlays may be further "ruggedized" in order to protect the IC and antenna of the inlay and/or provide additional sturdiness to the inlay for its intended use.

The RFID labels may need additional material to allow for permanent and secure attachment to a surgical sponge or other surgical article. This will include either via a heat press process wherein a material is added that allows for the label to be attached by the melting of that material and pressing that material onto the sponge (heat, time and pressure) or via a sewing process where the material added will lend itself to being attached to sponge material through a sewing process (the material will securely hold a thread, or the like.

A UHF RFID label 12 is then permanently and securely affixed to each sponge 10 or other surgical article. Exemplary attachment methods comprise heat pressing or sewing, and may be manually performed one at a time or, more likely, involve some form of automated fabrication that allows a high volume attachment process. The UHF or other RFID label is preferably attached to the surface of sponge material, and the sponge material may or may not be further folded or processed before the sponge product is in its final format. Thus, the UHF or other RFID label may be on the outside surface or "inside" the final sponge.

IV. Assembly and Programming of Sponge Packs

Figure 2:
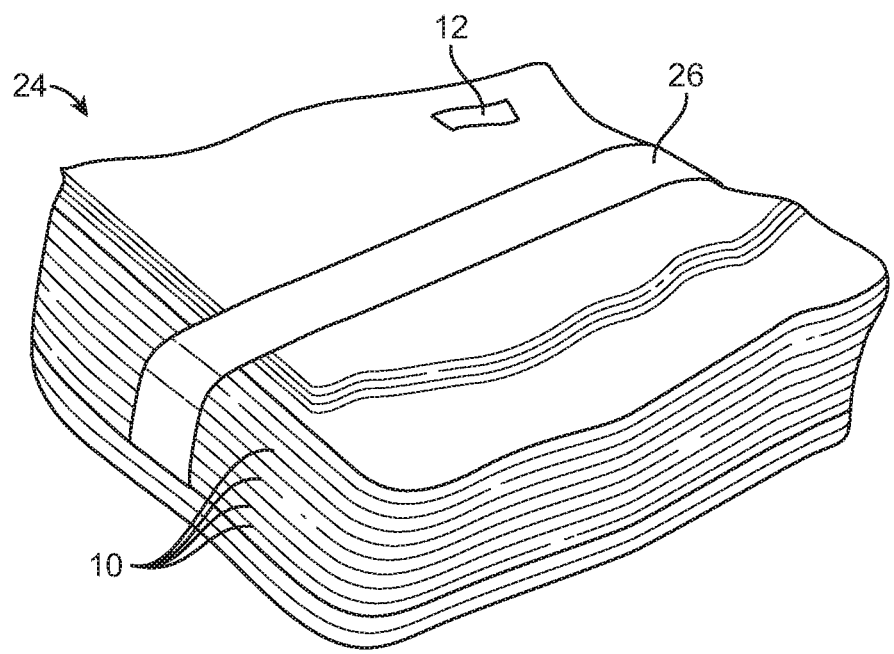
FIG. 2 illustrates a pack of surgical sponges of the type shown in FIG. 1.
Figure 3:
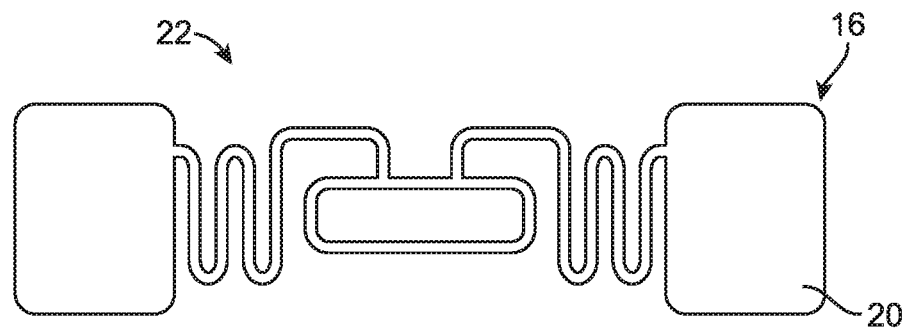
FIG. 3 illustrates an RFID inlay of the type useful in preparing the RFID labels of the present invention.
Figure 4:
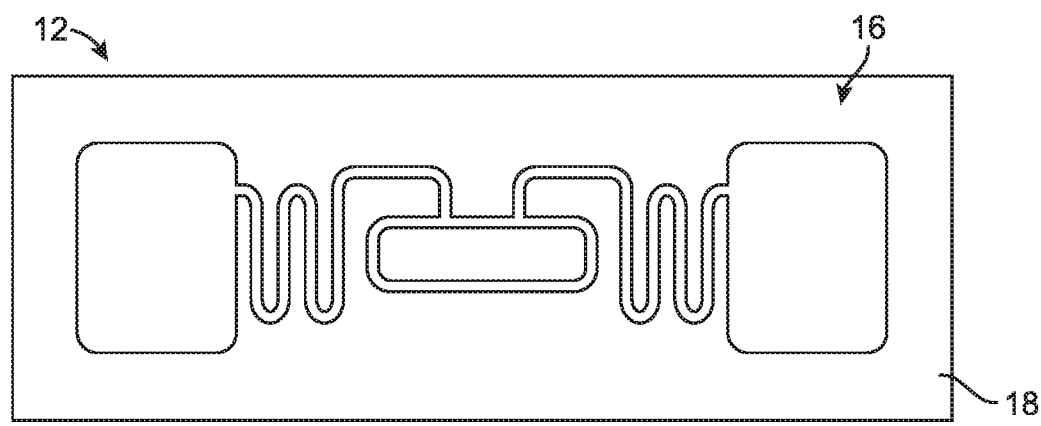
FIG. 4 illustrates the RFID inlay of FIG. 3 attached to a backing to form an RFID label in accordance with the principles the present invention.
Figure 5:
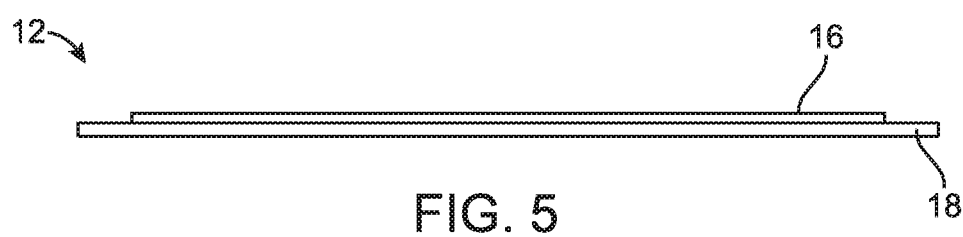
FIG. 5 is a side view of the RFID label of FIG. 4.
Figure 6:
FIG. 6 is a side view of an alternative embodiment of an RFID label in accordance with the principles of the present invention.

Surgical sponges are seldom packaged individually, and they most often come in a pack 24 of multiple sponges 10 of the same type, as shown in FIG. 2. Typically surgical sponges 10 come in packs of 5 or 10. After a UHF RFID label is affixed to each individual surgical sponge 10 (and after those surgical sponges are optionally further processed), a plurality of individuals sponges of the same type may be assembled together into a pack 24, usually held together by one or more bands 26, as shown in FIG. 2, typically by a single paper bands, but two, or more paper or other bands may be used. Other packings may also be used for the sponge packs, such as wrappings, boxes, trays, bags, and the like.

After assembling the surgical sponges 10 into packs 24, the UHF RFID or other labels 12 affixed to the individual sponges are programmed, usually one pack at a time, but alternatively by pre-encoding the RFID tags in a separate step, and then applying them to the sponges and making the sponge packs. The label on each individual sponge 10 in each pack 24 is programmed with a minimum of three types of information. First a sponge type identifier is encoded on the RFID tag or other label to inform the sponge tracking system of the type of the individual sponge, e.g. a 4×4 sponge, a 4×8 sponge, a particular type of towel, or the like. Second, a unique pack identifier is encoded to provide an identifier that is common to all individual articles in that pack. The unique pack identifier is the same for each individual sponge in a given pack but is unique as to all other packs that might be expected to be used in a particular procedure, present in the same facility, present in the same distribution chain, or the like. Thus, by "unique," it is meant that the pack identifier for a particular pack will not be repeated in any other packs that have any realistic likelihood of ending up in the same procedure. It does not mean that a pack number can never be duplicated under any circumstances. Third, an identifier that is unique to that individual surgical article within the pack is encoded onto the label. That is, if there are five total articles in a pack, each article will have a unique identifier, for example a number from 1 through 5. Often the unique article identification code will be a combination of the pack identifier and article identifier, e.g. the article number of that sponge in the pack, e.g. 1, 2, 3, 4, and so on. The UHF RFID labels may also be programmed with the total number of sponges in the pack. The total sponge number may be explicitly encoded or may be derived from the sponge type identifier, e.g. all 4×4 sponges come in a 5-pack. Once programmed, the UHF RFID memory of the inlays will be usually "locked" so that they cannot be accidentally reprogrammed at a later time. The identifiers may use any available code, typically being ASCII (American Standard Code for Information Interchange), HEX, or BIN alphanumeric codes, including numbers, letters, and special characters.

Unique identification information will typically be encoded on an RFID label in a field of alpha numeric characters. When using an UHF RFID tag or label of the type preferably being utilized on the sponges and other disposable articles being labeled herein, the data field available for identification information will usually be limited to 12 or fewer characters. The 12 character limit comes from the fact that 96-bit memory space can accommodate 12 ASCII characters (8 bits per character). If encoding with HEX characters, then the memory will accommodate up to 24 characters (4 bits per HEX character). With larger EPC memory, or user memory, more characters can be encoded. While the present invention is particularly suitable for use with such limited length data field, the principles of the present invention can be applied to electronic labels with longer data fields available for storage of such identification information.

As shown in FIGS. 7A-7C, each UHF RFID tag will typically be encoded with 12 alpha numeric characters which are typically divided into at least three fields (although the number of characters and the number of fields may vary). As shown in FIG. 7A, there is a two-character article type field, an eight-character pack identification field, and a two-character article identification field. The pack identification field and article field can be combined into the sponge identification field. When using numbers, for example, the two-charter type field may identify up to 99 different types of surgical articles. When using sponges, the number of different article types will be more than sufficient. For other articles where there may be more types to be identified, letters may be used in the article type field (which provides up to 676 unique article types), or the field can be increased by one or more characters. The pack identification field of eight characters should be sufficient for most purposes. For example, a two-character article field using alphanumeric characters would provide 1296 unique article identification codes (36×36 using 10 numerals and 26 letters) allowing up to 1296 articles in any one pack. It is unlikely that more articles will be present. In addition to article type, pack identification field, and article field, the methods of the present invention typically require that the identification data provide the total number of articles in the pack. This could be provided by dedicating one or two of the characters to a dedicated total article number field. Alternatively, the type of article may be associated with a fixed number of articles in a pack, in which case the processor can infer the total number of articles from the article type code.

Referring now to FIG. 7B, the identification information for a second article in the same pack as the article shown in FIG. 7A is presented. As can be seen, the type code is identical, the package identification field is identical, but the article field is 05 instead of 01 in as in FIG. 7A. Assuming that the article type 44 presents a 5-pack of 4×4 sponges, a system scanning either the coding in FIG. 7A or the coding in FIG. 7B could infer that the pack is a pack of five 4×4 sponges with the unique pack identification field indicated. Moreover, by scanning each of the surgical sponges in the pack, the system can confirm that there is one sponge with each article number between 1 and 5 and that there are no other sponges present. Once that is determined, the system can confirm that the pack is complete and that no extraneous sponges are included in the pack. At that time, the system can upload this information on to the list maintained of sponges available for the surgical procedure.

Referring now to FIG. 7C, an exemplary identification field having four fields is illustrated. The first field is provided for the total number of articles in a pack. A second field is provided for the article type. A third field is provided for the pack identification field, and a fourth field is provided for the article identifier based on this tag. The system can determine that the articles are large towels (LT), that there are ten towels in the pack, that the pack has the unique identification identifier, and that this particular towel being scanned is the third of ten in the pack.

As described thus far, the article identification fields are unique but not secure. That is, unauthorized manufactures could reverse engineer any of the UHF RFID tag numbering codes to produce UHF RFID tags which could operate in the tracking systems of the present invention and, in particular, which would be compatible with reading devices intended for use with sponges and other surgical articles labeled in accordance with the present invention. To avoid such unauthorized use, which can allow substandard products to be used in the proprietary systems of the present invention, a security code can be added to the data encoded on the UHF RFID tag, as shown in FIG. 7D. Most simply, the security code can be a "check digit' or other short code sequence that can be calculated from the other information in the identification fields encoded on the sponge. For example, a unique algorithm or "key," typically a private key, can be used to generate a security code based on the pack identification field, and the security code can be stored in a security code field at the time the UHF RFID tag is produced. When the UHF RFID tag is read prior to use, during shipment, or at any other time, the algorithm key, typically a public key, can be used to confirm that the security code matches the code that is generated by the pack identification field. As the private key algorithm is kept private and will not be available outside of the label manufacturing organization, outside vendors and manufactures will not be able to produce security codes which match the pattern of digital identification information on the sponge.

In preferred embodiments, the security code will be generated based not only on the user-specified pack or sponge identification field, it will further be based on the unique UHF RFID tag manufacturer's information contained in the TID field at the time the tag is manufactured (all commercially available UHF RFID tags have such TID information). As the identification information encoded in the TID field is also unique for that label (i.e. no two UHF RFID labels have the same TID field information), the security code has an additional level of complexity and a reduced risk of reverse-engineering. Thus, as shown in FIG. 7D, the pack identification field and the unique article field will together still provide a unique alphanumeric article identifier, but will provide a secure alphanumeric article identifier when further combined with the security code.

In summary, the UHF RFID tags of the present invention may be prepared in a number of ways to provide labels with and without security codes. Exemplary steps for preparing a UHF RFID tag without a security code in accordance with the principles of the present invention are set forth in Table I, below:

TABLE I

Simple ID Tag Encoding Without Security Code

A data stream including the article identification is loaded it the EPC field of an UHF RFID tag
After programming, the UHF RFID tag is read and the encoded data are verified, which also confirms the UHF RFID tag is functional
The UHF RFID tag is locked (becomes a read-only tag) or password protected (with a password that unlocks the tag and allows rewriting)
This procedure can be performed one tag at a time, or through bulk encoding. Encoding can be done using a wide range of commercially available hardware systems A data stream including the article identification is loaded it the EPC field of an UHF RFID tag
After programming, the UHF RFID tag is read and the encoded data are verified, which also confirms the UHF RFID tag is functional
The UHF RFID tag is locked (becomes a read-only tag) or password protected (with a password that unlocks the tag and allows rewriting)
This procedure can be performed one tag at a time, or through bulk encoding. Encoding can be done using a wide range of commercially available hardware systems The exemplary steps for preparing a UHF RFID tag with a check digit security code in accordance with the principles of the present invention are set forth in Table II, below:

TABLE II

Check Digit ID Tag Encoding

A data stream including the article identification is loaded it the EPC field of an UHF RFID tag
The article identification is first used to calculate unique check digit(s) (based on a private key algorithm) which would be inserted into the sponge ID data string as the security code.
After programming the check digits into the security code or other user accessible field, the UHF RFID tag is read and the encoded data including the check digit(s) are verified, which also confirms the UHF RFID tag is functional
The UHF RFID tag is locked (becomes a read-only tag) or password protected (with a password that unlocks the tag and allows rewriting)
The UHF RFID tags can be read with a public key algorithm which can instantly verify the validity of the sponge ID with check digit(s)

A data stream including the article identification is loaded it the EPC field of an UHF RFID tag
The article identification is first used to calculate unique check digit(s) (based on a private key algorithm) which would be inserted into the sponge ID data string as the security code.
After programming the check digits into the security code or other user accessible field, the UHF RFID tag is read and the encoded data including the check digit(s) are verified, which also confirms the UHF RFID tag is functional
The UHF RFID tag is locked (becomes a read-only tag) or password protected (with a password that unlocks the tag and allows rewriting)
The UHF RFID tags can be read with a public key algorithm which can instantly verify the validity of the sponge ID with check digit(s)

While providing adequate security for most purposes, with access to a large number of UHF RFID labels, the key algorithms used to encode such check digit security codes can be reverse engineered and private key algorithm deciphered. Access to the private key algorithm would allow unauthorized manufactures to produce counterfeit UHF RFID labels compatible with the UHF RFID readers of the present invention. Thus, in some instances it may be desirable to change the check digit private and public key algorithms periodically. Such changes would necessitate updating all the software in all readers in the field to be compatible with the new coding.

Use of a security code based on the TID information, referred to as an encrypted signature, would provide a higher degree of security and reduce or eliminate to periodically update the key algorithms. Exemplary steps for preparing a UHF RFID tag with an encrypted signature security code in accordance with the principles of the present invention are set forth in Table III, below:

TABLE III

Encrypted Signature ID Encoding

A data stream including the article identification is loaded it the EPC field of an UHF RFID tag
Read the TID information of the specific UHF RFID tag TABLE III-continued Encrypted Signature ID Encoding The unique TID information is combined with the article identification to produce an encrypted signature ID inserted into the sponge ID data string as the security code
After programming the encrypted signature into the security code or other user accessible field, the UHF RFID tag is read and the encoded data including the encrypted signature are verified, which also confirms the UHF RFID tag is functional
The UHF RFID tags can be read with a public key algorithm which can instantly verify the validity of the sponge ID with encrypted signature A data stream including the article identification is loaded it the EPC field of an UHF RFID tag
Read the TID information of the specific UHF RFID tag
The unique TID information is combined with the article identification to produce an encrypted signature ID inserted into the sponge ID data string as the security code
After programming the encrypted signature into the security code or other user accessible field, the UHF RFID tag is read and the encoded data including the encrypted signature are verified, which also confirms the UHF RFID tag is functional
The UHF RFID tags can be read with a public key algorithm which can instantly verify the validity of the sponge ID with encrypted signature Since the encrypted signature is independent of the sponge or other surgical article, the steps of reading the TID, encrypting the TID, storing the encrypted signature in the tag memory (EPC or user), and verifying can all be performed in separate steps, processes, and/or locations. Thus, the UHF RFID tags of the present invention could be pre-encoded with the encrypted signature based on the TID information only and subsequently be encoded with the product specific data after the encrypted signature is locked, optionally at a different location, further enhancing the integrity of the security encoding process.

As an added data, product, and supply chain integrity check, all the authentic UHF RFID data (TID, article ID, date, location, customer information, etc.) can be loaded in a centralized or other database. All the article scans in the field performed could be reported back to this database, together with other information (timestamp, location, processor device, RFID scanner device, software version, user ID, etc.). Anomalies, such as mismatched TIDs and sponge IDs, or unexpected scan locations, could provide alerts into a compromised supply chain or other failures.

Programmed, banded packs may be separated into two formats prior to use in the operating room. In a first format, referred to as "Single-Sterile," banded packs of surgical sponges are programmed for use are then placed in final packaging, with one banded pack of surgical sponges per single-sterile package. Packaging materials used include materials that allow permeation of sterilizing agents. In a second format, referred to as "Bulk Non-sterile," banded packs of surgical sponges are sent for inclusion in custom procedure trays (CPTs) along with various other items to be used in a particular procedure (caps, gowns, drapes, other packs of surgical sponges, needles, etc.). CPT's are packaged in containers comprised of permeable materials to allow sterilization. Both Single-Sterile Bulk Non-sterile packages are typically sterilized utilizing ethylene oxide.

Packs may be programmed in a two-step programming sequence where a plurality of individual surgical or other articles items in a pack are scanned prior to programming their affixed RFID or other electronic labels. The type and number of articles is known, and the scan confirms that the correct number of individual labels is present for that type of article. The labels are then encoded with both individual and pack identification and optionally security features if encoded onto the labels. The pack then goes to a second scanner which scans those items and all the identifications information for the pack and the individiaul article are read and compared with the expected information for that pack. Assuming the information is correct, the user memories on the labels for all articles in the pack are locked and pack is completed. If the comparison fails, the pack is rejected. To enhance efficiency, the two steps may be performed simultaneously of successive packs.

V. Counting in Sponges at Start of Surgical Procedure

Figure 8:
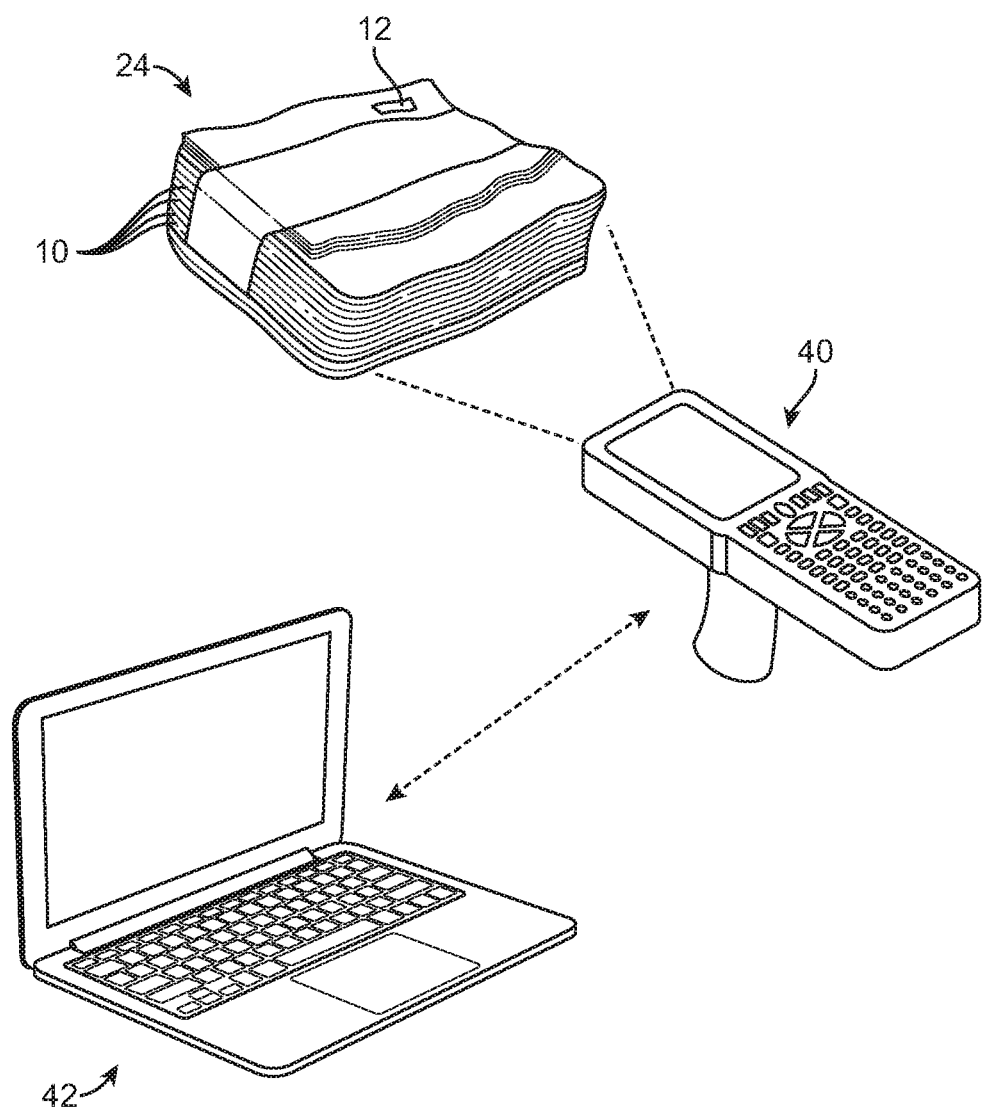
FIG. 8 illustrates an exemplary system including a processor and an RFID reader for interrogating a sponge pack having the RFID labels of the present invention.

Hardware and software are provided to the operating room (OR) prior to a surgical procedure. The hardware may comprise a processor, such as a mobile or laptop computer, tablet, personal digital assistant, or even a smart phone, coupled to an RFID reader, typically a UHF RFID reader. These may be similar or identical to those used for programming as shown in FIG. 8. While both the processor and UHF reader may be separate, commercially available devices, it will often be preferred to combine them into a single device, either a commercially available programmable device or a device custom-developed for the present invention. When separate, the processor and the RFID reader may be connected physically by a communication cord or wirelessly via Bluetooth or other wireless technology. Means are provided for attaching the mobile computer and UHF reader to a stable, mobile stand (likely an IV pole) in a fashion where both can be easily attached, removed, and reattached. The processor be programmed or uploaded with a user application which typically provides at least four functionalities. A first functionality provides for real-time counting and finding of the sponges or other surgical articles during the surgical procedure. A second functionality aggregates the data and information captured during a specific case (e.g. to allow producing a Procedure Report). A third functionality enables sending the data and information captured during a specific case (e.g. a Procedure Report) to an external database application for analysis and/or archiving. A fourth functionality enables receiving data and information from the external database application which can be used for various uses including updating or changing settings on the mobile device user application or other purposes.

As shown in FIG. 8, the sponges are initially scanned while in a banded pack 24 or other package type. A handheld RFID scanner is connected wirelessly or through a cable to a processor 42, shown to be a laptop or mobile compute 42, but which could alternatively be a tablet computer, a personal digital assistant, or even a smart phone. The processor 40 has software or an application which enables the processor to upload the identification data described above from the individual RFID labels. As an alternative to the use of separate RFID reader/programmers and processors, a combination device could be provided which incorporates all functions of both into a single, preferable hand-help enclosure. In all cases, the processor 42 will be able both to store the individual identification codes as the sponge packs are scanned in to create lists of available sponges or other surgical articles and to record that individual sponges have been accounted for as they are counted OUT of the surgical procedure, as described in more detail herein below.

Banded packs of surgical sponges or other articles are usually delivered to the OR as sterilized single-sterile packs or inside sterilized CPT's, as described above. An OR nurse or other user uses the mobile device user application to start a new Procedure Report on the mobile device or other user interface. Procedure specific information is entered into the Procedure Report including a patient identifier, user identifier and other case specific information (e.g. a type of procedure, a surgeon name, or the like). After all procedure specific information is entered into the Procedure Report, the user is ready to use the system to count sponges IN. The user may enter some procedure specific information at this point and additional procedure specific information at a later time.

Figure 9C:
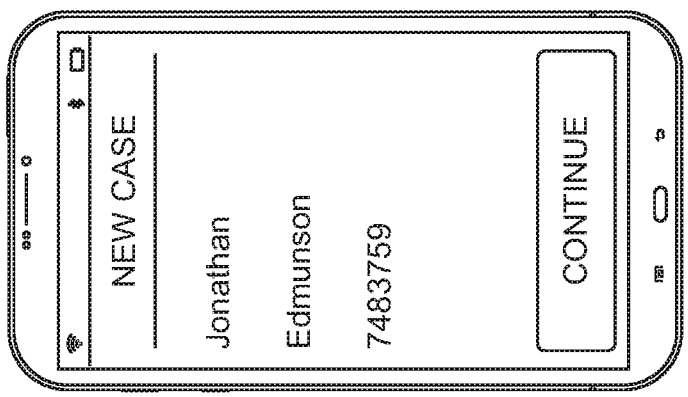
FIGS. 9A-9K illustrated screen shots of an exemplary interface used with the sponge accounting systems of the present invention in both the count IN mode and the count OUT mode.
Figure 9B:
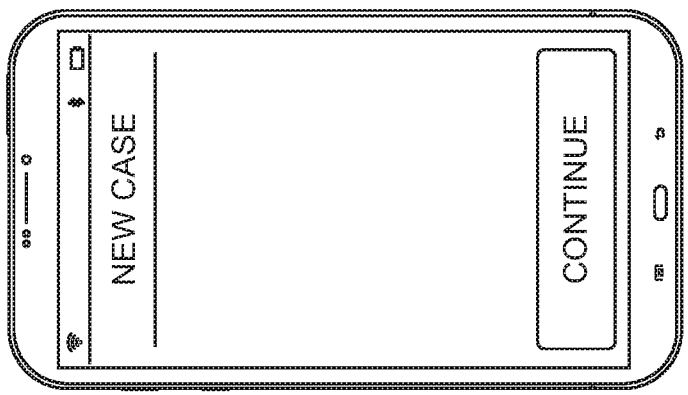
Figure 9A:
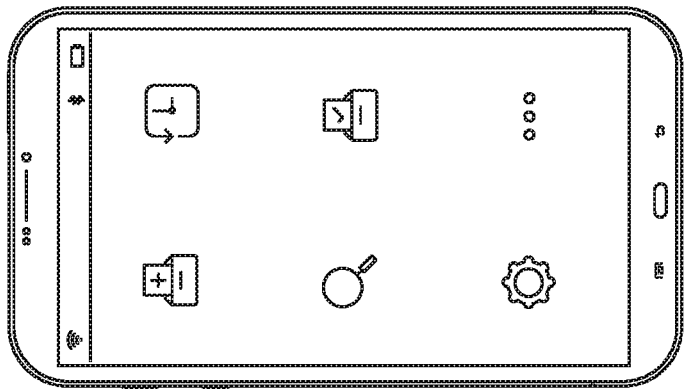
Figure 9F:
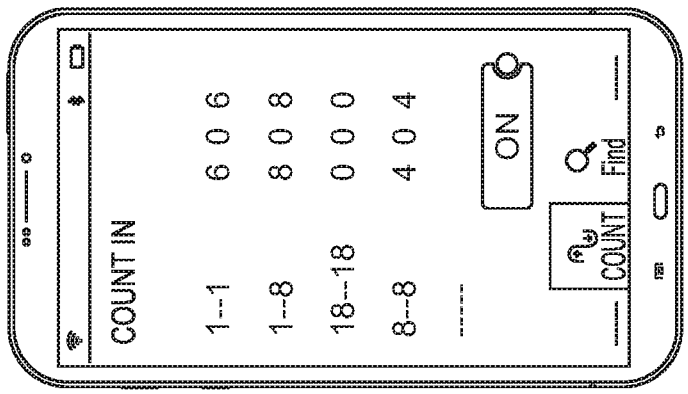
Figure 9E:
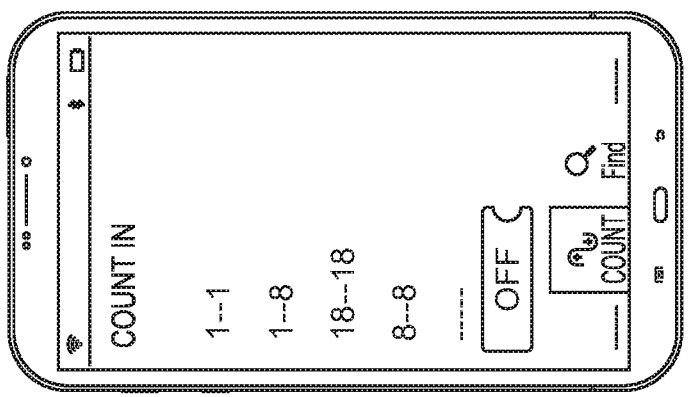
Figure 9D:
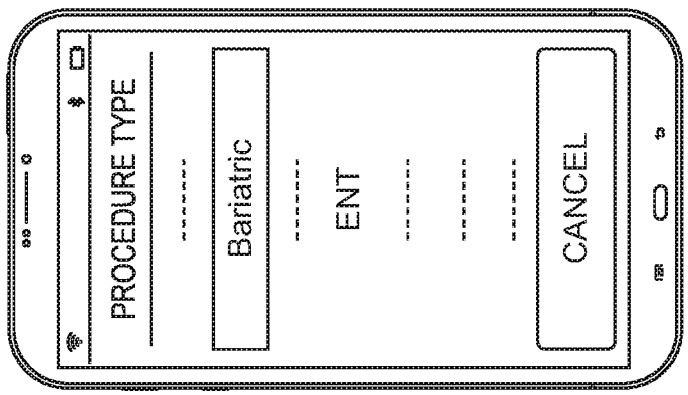

The sponges or other surgical articles may be counted IN as follows. The packs of sterile sponges or other articles are removed from the single-sterile packs or CPT's. Individual labeled sponges or other surgical articles in the packs are counted as follows:

(1) The user starts a procedure by selecting "New Case" on the home screen of the processor, as shown on the tablet of FIG. 9A, which brings up the new Case screen as shown in FIG. 9B. After the patient information is entered, as shown in FIG. 9C, the user can select the procedure Type, as shown in FIG. 9D. has been selected, the user can choose "Continue" (FIG. 9D) and puts the application (software) in COUNT IN mode (FIG. 9E);

(2) After turning the count mode on (FIG. 9F), the user holds or places one pack of articles, such as a banded pack of UHF RFID-labelled surgical sponges, in a scan zone of the UHF RFID reader, e.g. a location approximately 18 inches from the reader, e.g., as shown in FIG. 8. The UHF RFID reader will typically be powered at a level selected to limit the range of the reader to prevent counting IN packs of sponges that are outside of the scan zone;

(3) The processor interface emits an audio or other signal when all individual sponges in a given pack have been successfully counted IN. The system will know when all sponges have been counted based on the information present on any one label as discussed above. The type identifier, pack identifier, and total number of sponges intended to be in the pack can all be obtained from the first sponge label read. The system will look for each of the other sponges which are supposed to be in pack to determine that they are present. In particular, the system can distinguish among each of the sponges based on the article number which is unique to that sponge within the pack. If each of the expected sponges cannot be found, or an unexpected sponge is present, the pack must be defective and interface will generate an alarm. The pack can then be discarded;

(4) Assuming, however, that the count IN determines that all sponges are present and properly labelled and that no extraneous sponges are present, the identification data for each sponge in the pack is registered or entered into the system data storage, and the interface we provide an audio and/or visual prompt that the pack is not defective and that all sponges or other articles have been registered in the system. The audio prompt might be the word "five" to signify the successful counting IN of all five individual sponges in a five pack or the word "ten" to signify the successful counting IN of all ten individual sponges in a ten pack. Simultaneously when the individual sponges in a pack are counted IN' the user interface will display the number of sponges of that type counted IN has incremented up by the number in that pack (typically five or 10). Further, the display will usually display the number of each type of sponge counted IN, the number counted OUT and the number LEFT (the difference between the numbers of each type counted IN and counted OUT). For example, the interface display might then appear as in FIG. 9F where the types of sponges are in a first column, the numbers of each type counted IN are in a second column, the numbered counted out (which is all zeros since none have been counted out) are in a third column, and the number of each type remaining (equal to the number counted IN) are in a fourth column.

(5) Typically, the user will also manually count the individual sponges in each pack to confirm manually the number of sponges in that pack;

(6) Nurse may also manually record the number of each type as they are counted in one pack at a time;

(7) This procedure is repeated for all packs until all labelled sponges have been successfully counted IN; and (8) Once all sponges that are intended to be used in a procedure are counted IN the user turns the interface and RFID reader to an OFF mode. Usually, should the interface and RFID reader not be manually turned off, the system will automatically turn OFF after a predetermined amount of time has passed without scanning any items.

Once all sponges have been counted IN, the surgical procedure can begin. The labelled surgical sponges are placed at and removed from the surgical site during the course of the procedure. When removed from the surgical site, OR personnel typically dispose of used labelled sponges in a waste bucket, typically called a "kick bucket". The kick bucket can be moved away from the patient and a user personnel can remove the sponges and count them OUT using the reader and interface as described below.

VI. Counting Out and Accounting for Sponges at End of Surgical Procedure

Figure 9I:
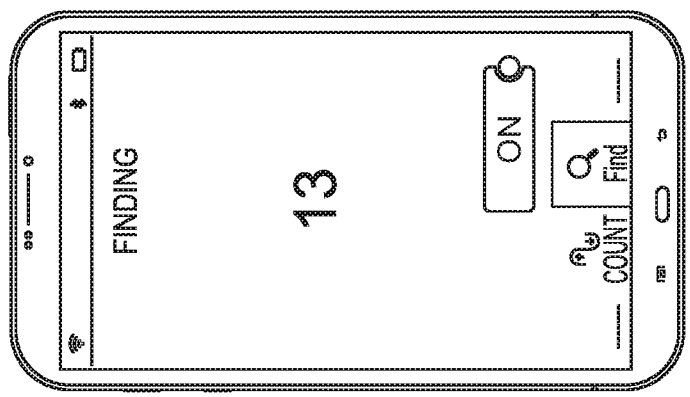
Figure 9H:
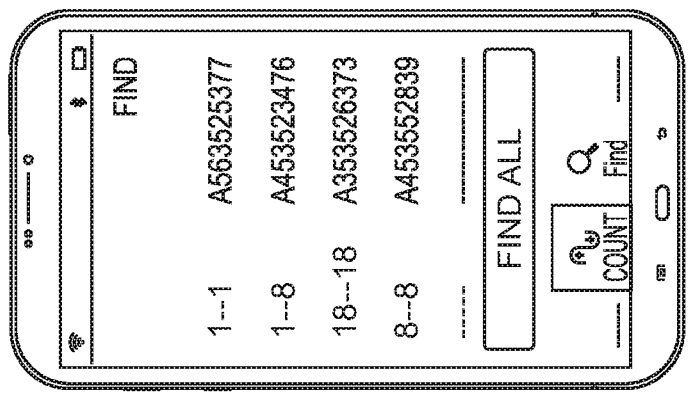
Figure 9G:
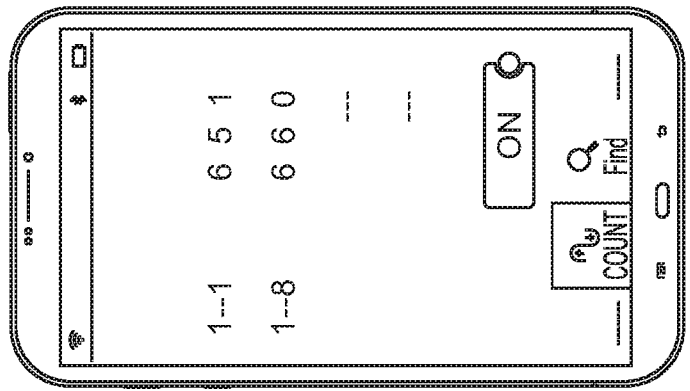

Counting OUT of sponges or other surgical articles can be performed as follows:

(1) A nurse or other user puts the software in count OUT mode, e.g. user the interface as shown in FIG. 9G. As individual sponges are scanned out, either individually or in bulk, the numbers of sponges removed shown in the third column will increase and the numbers of sponges remaining in the fourth column will decrease. Assuming that the initial count OUT has been completed, it can be seen that one 4×4 sponge is unaccounted and that all 4×8 sponges have been located.

(2) In a first exemplary protocol, the user will put the RFID reader and interface into the OUT mode and will scan one used surgical sponge at a time by placing the used sponge in the scan zone of the reader, just as in the COUNT IN mode. In the COUNT OUT mode, the RFID reader may be set on a predetermined power setting so as to optimize the desired read range, for example limiting the read range to a smaller distance to prevent sponges not in the immediate area to be scanned OUT. When the RFID reader successfully scans each labeled surgical sponge OUT, an audio and/or visual prompt is provided. Note the RFID reader will be scanning in a constant process so likely the audio prompt is usually provided only the first time the item is successfully read and not thereafter. Once a sponge counted IN has been successfully counted OUT, the software will also increment the displayed number of that type sponges of that type successfully scanned OUT and decrement the number shown to be LEFT.

(3) In a second exemplary protocol, the RFID reader can be picked up and scanned over a collection of used labelled sponges that have been removed from the patient. Typically scanning might be over a pile of used sponges placed on a table or alternatively over sponges still in the kick bucket and waving the RFID reader over the bucket, moving the RFID scanner over the plurality of used sponges to be counted OUT.

(4) Step (2) or (3) is repeated until all labelled sponges counted IN have been successfully counted OUT or until the user believes that certain sponges cannot be accounted for by this scanning step.

VII. Locating Unaccounted Sponges

Figure 9K:
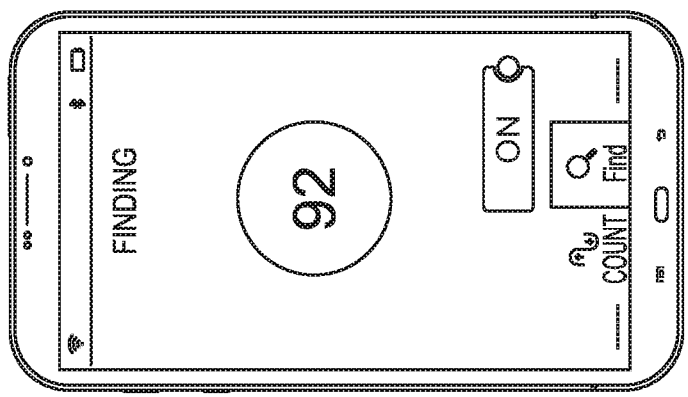
Figure 9J:
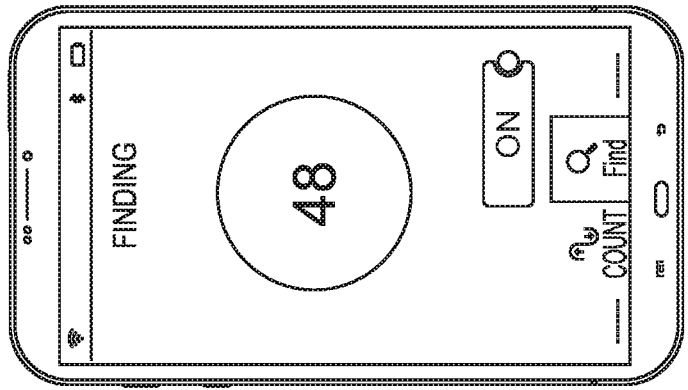

If there are any labelled surgical sponges or other surgical articles that were counted IN a procedure that have not been successfully counted OUT, they are missing and referred to herein as "unaccounted" sponges or surgical articles. The user can use the system of the present invention to FIND each sponge as follows:

(1) The user uses the interface to put the system software in FIND mode, typically using the interface as shown in FIG. 9H;

(2) The software will display each individual sponge (by its unique identifier) that was counted IN that has not yet been counted OUT, and is therefore an unaccounted sponge, on the interface (FIG. 9H);

(3) The user can select an individual unaccounted sponge in the displayed list to FIND. The software/UHF RFID reader will be then "looking" for that individual sponge (via its unique identifier). In this aspect of the present invention, the use of a "UHF" RFID reader is preferred since it is less likely to detect sponges left in the body as it is generally unable to scan through human tissue. In the COUNT OUT mode, the UHF RFID reader may be placed in a predetermined power setting so as to optimize the desired read range, for example setting the UHF RFID reader at a maximum power setting extends the read range in the FIND mode to facilitate locating an unaccounted or missing sponge. Once in FIND mode, and after a particular unaccounted sponge has been selected, the user will typically hold the UHF RFID reader and move it through the room until a prompt (typically auditory) is provided signifying the reader has successfully identified (scanned) the unaccounted for sponge. That is, a signal was sent from the UHF RFID reader that reached and was received by the unaccounted sponge, a signal was sent back (typically reflected in the passive mode) from the UHF RFID sponge and received by the UHF RFID reader. The strength of the signal received by the RFID reader is indicative of the distance between the RFID reader and the unaccounted sponge and may be displayed on the mobile device. The RFID reader is then moved in a direction, and the user is provided with additional prompts and signal strength readings upon successful scans of the unaccounted for sponge. The RFID reader and interface may provide successive prompts as to the relative strength of the signal received by the reader increases or decreases (for example, beeping more rapidly as the signal strength increases and more slowly as the signal strength decreases). This provides an intuitive audio feedback as to if the UHF RFID reader is moving closer or father away from the unaccounted sponge or other article. By assessing such relative strength indications (audio and/or visual), the user can move toward the unaccounted sponge or other article until it is found. The interface may also provide a visual indication of the distance between the RFID reader and the target sponge. As shown in FIG. 9I, the signal strength is low (13) and the distance indicated by the outer concentric ring is far. As the user moves the RFID reader closer to the target sponge, the signal strength increases to 48, and the target sponge is near as shown by the displayed ring, as shown in FIG. 9J. Finally, when the signal strength increases to 92 and, the inner circle displays and indicates that the target sponge is here, as shown in FIG. 9K;

(4) Once the unaccounted sponge or other article is found, the interface is used to put the software is put into count OUT mode and the unaccounted sponge or other article is counted OUT; and (5) This process is repeated until all unaccounted sponges or other articles have been found.

Note that at any time during or after a surgical procedure, the interface can be used to put software into count IN mode (to add more sponges to the procedure if necessary), count OUT mode (to count out sponges removed from the patient) or FIND mode (to find missing sponges).

Once all sponges counted IN have been counted OUT, the user finalizes the Procedure Report by closing it (an option in the application). If a user attempts to close a Procedure Report that has missing sponges, a visual and/or audio alert is generated by the interface warning that not all sponges or other articles have been properly accounted for. The closed Procedure Report is then typically sent from the mobile device (interface and RFID scanner) to the backend database application. This can be done wirelessly if the mobile devices are connected to a Wi-Fi network or done by physically connecting the mobile devices to another device that can transfer the Procedure Report to the backend database application.

While the present invention has been described herein with respect to the exemplary embodiments and the best mode for practicing the invention, it will be apparent to one of ordinary skill in the art that many modifications, improvements, combinations, and sub-combinations of the various embodiments, adaptations and variations can be made to the invention without departing from the spirit and scope thereof.

What is claimed is:

1. A method for locating a missing surgical article at the end of a surgical procedure, wherein a plurality of surgical articles have been provided for use in the surgical procedure and each of the plurality is affixed with a UHF RFID tag configured to deliver a signal that will not penetrate tissue and programmed with identification data unique to the particular surgical article, said method comprising:

(a) reading with an RFID reader the UHF RFID identification information of each surgical article removed from a patient after a surgery;

(b) reading with the RFID reader the UHF RFID identification information of each surgical article which was not used in the surgery;

(c) uploading to a processor the UHF RFID identification information obtained in steps (a) and (b);

(d) compiling on the processor a list of surgical articles accounted for after the surgery by combing on the processor the UHF RFID identification information of each surgical article removed from a patient after the surgery with the UHF RFID identification information of each surgical article which was not used after the surgery;

(e) comparing on the processor the list of accounted for surgical articles compiled in step (c) with a list of surgical articles available for the surgical procedure to generate a list of unaccounted surgical articles; and (f) determining on the processor the identification information for one of the unaccounted surgical articles, if any.

2. A method as in claim 1, wherein the surgical article is assumed to still be within the patient's body if the unique reflected UHF RFID identification data from the unaccounted surgical article is not detected.

3. A method as in claim 1, wherein the patient is fluoroscopically scanned to find the unaccounted surgical article.

4. A method as in claim 1, further comprising repeating steps (e) and (f) for each additional unaccounted surgical article.

5. A method as in claim 1, wherein the surgical articles are gauze articles.

6. A method as in claim 1, further comprising:
(g) when the unique identification code of an unaccounted surgical article is detected, generating an indication of distance between the RFID reading device and the unaccounted surgical article; and
(h) providing the indication of the calculated distance to a user to aid the user in location the unaccounted surgical article.

7. A method as in claim 6, wherein steps (f) through (h) are repeated continuously.

8. A method as in claim 6, wherein steps (d) through (h) are repeated iteratively.

9. A method as in claim 6, wherein generating the indication of distance comprises determining a strength of a signal reflected from the UHF RFID tag at the RFID reader in response to the query signal from the RFID reader to the UHF RFID tag of the unaccounted surgical article.

10. A method as in claim 1, further comprising emitting a visual or aural signal when the unique identification code of the unaccounted surgical article is reflected back to the RFID reader.

11. A method of authenticating surgical articles used in a surgical procedure, said method comprising:
(a) providing a pack which contains a plurality of individual surgical articles, wherein each individual surgical article has an electronic label and wherein each label provides data which includes (a) unique identification information for that article and (b) a first security code generated based on other data present on the label using a key algorithm;
(b) prior to the surgical procedure, scanning the electronic label of at least one surgical article in the pack to obtain data including the unique identification information and the security code for at least one individual surgical article;
(c) generating a second security code using the same key algorithm based on data other than the security code scanned in step (b); and
(d) comparing the first security code generated in step (c) with the second security code scanned in step (b) to determine if the first and second security codes match, wherein matching first and second security codes indicate that the surgical articles were produced by a producer having the key algorithm.

12. A method as in claim 11, wherein the other data present on the electronic label includes information in the label manufacture's identification field.

13. A method as in claim 12, wherein the data on each electronic label further comprises an article type code, a pack identification code unique to that pack, an article count code representing the total number of articles in the pack, and an article code distinguishing that article from all other articles in the pack.

14. A method as in claim 13, further comprising scanning the electronic labels of all surgical articles in the pack, determining the unique identification information for each article expected to be in the pack, and comparing the unique identification information for each article expected to be in the pack with the unique identification information for each article actually scanned to determine if any surgical articles are missing or in any additional surgical articles are present.

15. A method of encoding a security code into an electronic label having at least a locked manufacturer's identification field and a lockable user identification field, said method comprising:
providing an electronic label loaded with locked manufacturer identification information;
providing data representing user identification information;
providing a key algorithm;
reading the locked manufacturer identification information from the electronic label;
using the key algorithm to combine the manufacturer identification information and the user identification information into an electronic signature;
loading the electronic signature into the lockable user identification field on the electronic label; and
locking the lockable user identification field on the electronic label after the electronic signature has been loaded.

16. A method as in claim 15, further comprising:
loading the data representing user identification information into the lockable user identification field on the electronic label; and
locking the lockable user identification field on the electronic label after the user identification information has been loaded.

17. A method as in claim 16, wherein the user identification information is loaded before the electronic signature is loaded.

18. A method as in claim 16, wherein the user identification information is loaded after the electronic signature is loaded.

19. A method as in claim 15, wherein the electronic label is an UHF RFID tag.

* * * * *